Figure 1:
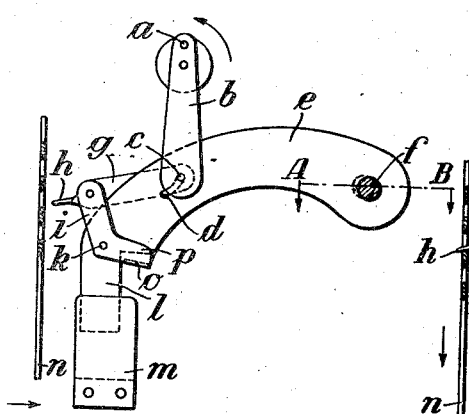

Dec. 3, 1940.   F. FALKENHAGEN   2,223,848
MECHANICAL MOVEMENT
Filed July 10, 1939

Inventor
Fritz Falkenhagen

By Owen & Owen
Attorneys

Patented Dec. 3, 1940

2,223,848

UNITED STATES PATENT OFFICE 2,223,848

MECHANICAL MOVEMENT

Fritz Falkenhagen, Berlin-Friedenau, Germany, assignor to Steatit-Magnesia Aktiengesellschaft, Berlin-Pankow, Germany Application July 10, 1939, Serial No. 283,552
In Germany July 30, 1938

3 Claims. (Cl. 74—166)

This invention relates to a crank driven gear for moving a conveying machine part in a closed approximately rectangular path.

Gears of this type are used for instance in devices for the gradual conveyance of bulk-articles or for producing a reciprocating motion involving the lifting of a tool, and as particular examples of their application the supply of electrotechnical mass articles to the gripping device of a machine tool, the drive of a film engaging means for cinematographic apparatus and the movement of a steel for surface treatment may be mentioned.

The invention aims at improving the known gears and has for its object to provide a gear that is as flat as possible and so constructed as to be subjected only to slight friction and wear, its flat construction reducing, furthermore, to a minimum tilting moments which might cause clamping of the moving parts.

The invention attains its object by guiding the connecting rod of the gear by means of a link pin in a slotted hole of a rocking lever yieldingly resisted in its motion by suitable means and by connecting the conveying machine part, hereinafter referred to as "conveying member," with the link pin of the connecting rod and also, through the medium of a link, etc., with the rocking lever in such manner that during the up and down motion of the connecting rod first the link pin is moved in the slot to bring about an approximately horizontal motion of the conveying member, whereupon, after completion of the horizontal motion, the rocking lever is moved and the conveying member carries out an approximately vertical motion. The horizontal motion of the conveying member is preferably terminated by the contact of the link pin and the ends of the slot or of the link, etc., and the rocking lever, though both members mentioned may possess stops to provide for the mutual relief of the limiting surfaces.

The gear according to the invention affords the added advantage that the horizontal motions of the conveying member can be fixed in a certain path in a very simple manner, this being effected in the example shown by imparting a curved shape to the slot in the rocking lever. A film engaging means may thus be caused for instance softly to be placed on and lifted from the edge of the perforations to preserve the latter.

In a preferred embodiment of the invention the rocking lever is checked in its motion by elastic means, particularly leaf springs.

Figure 5:

The invention is illustrated by way of example in the accompanying drawing which shows a drive for a film engaging means and in which Figures 1 to 4 show the driving gear in four successive most important operating positions;

Fig. 5 is a partial view of Fig. 1 in the direction of the arrow and

Figure 6:
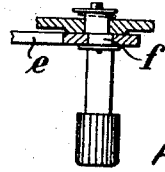

Fig. 6, a section on the line A—B, of Fig. 1.

A crank $a$ driven by an electromotor, spring mechanism or other source of power moves a connecting rod $b$ whose lower end is guided by a link pin $c$ in the slotted hole $d$ of a rocking lever $e$. The rocking lever $e$ is arranged so as to be movable about the pivot $f$ which, as indicated in Fig. 6, through eccentric location may be displaced to a certain extent so as to permit vertical adjustment of the pictures in known manner. Besides being connected with the rod $b$ the link pin $c$ is coupled also with a conveying or driving member $g$ the end of which opposite from the pin $c$ is fitted with a tooth $h$. Near the tooth $h$ the conveying or driving member $g$ is guided by a link $i$ disposed on the rocking lever $e$ and movable about a pivot $k$. The free end of the rocking lever $e$ is provided with a braking member $l$ against whose side faces leaf springs $m$ abut to resist the motion of the lever $e$.

The device shown functions as follows:

If the crank $a$ moves out of the position shown in Fig. 1 in the direction of the arrow, the rocking lever $e$, due to the friction of the leaf springs $m$, remains at first in its position, but the link pin $c$ moves in the slot $d$ and causes horizontal motion of the conveying member $g$ to introduce the tooth $h$ into a perforation of a film $n$.

Figure 3:
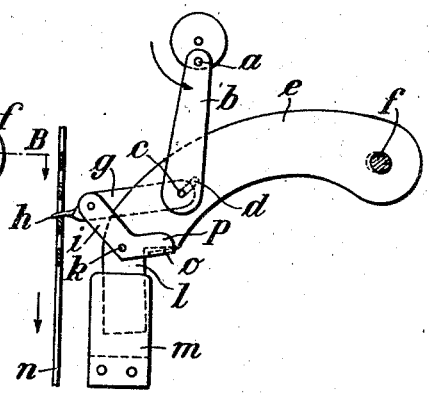
Figure 2:
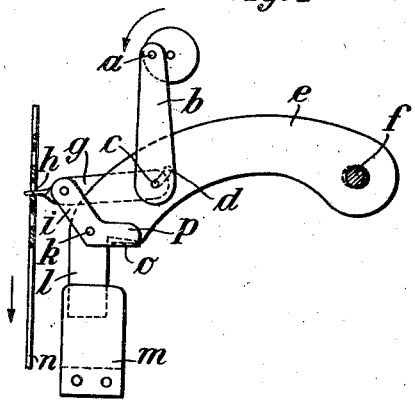

In the position shown in Fig. 2 the motion mentioned is completed. The link pin $c$ abuts against the lower end of the slot $d$, and against the rocking lever $e$ bears a surface $o$ provided on the portion $p$, not connected with the conveying member $g$, of the link $i$ having the form of a bell crank. In consequence of the simultaneous application of the members $c$ and $o$ the forces developed during the subsequent working stroke will be distributed over both application surfaces whereby the wear is reduced. After completion of its horizontal motion the conveying member $g$ is fixed relative to the rocking lever $e$. The further descent of the connecting rod $b$ brings about an oscillatory motion of the rocking lever $e$ in downward direction against the resistance of the leaf springs $m$ on the braking member $l$ so that the tooth $h$ which is in engagement with a perforation moves the film $n$ to the extent of a picture space. The termination of the downward motion is indicated in Fig. 3.

Figure 4:
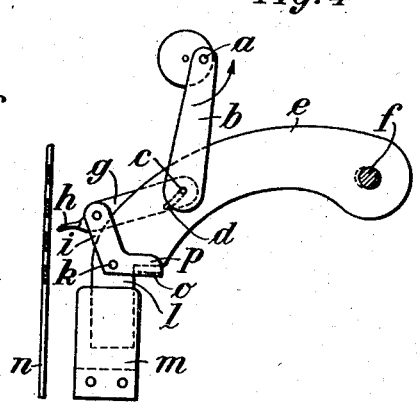

During the subsequent upward motion of the connecting rod b the rocking lever e remains in lower position owing to the friction of the leaf springs m, but the link pin c is upwardly displaced in the slot d in inclined direction and effects horizontal motion of the conveying member g for the purpose of withdrawing the tooth h from engagement with the perforation. This horizontal motion is completed when the link pin c strikes against the upper end of the slot d, Fig. 4 showing the position at which the return motion of the tooth h is completed. The further ascent of the connecting rod b causes an oscillatory motion of the rocking lever e in upward direction while the conveying member g carries out an approximately vertical motion at the end of which the position of the gear as shown in Fig. 1 is restored.

It will be seen that the direction of rotation of the crank a is of secondary importance for the mode of operation of the gear in so far as the working stroke always occurs in the same direction independently of the direction of rotation. By corresponding dimensioning of the lever arms the relation of the distances covered in vertical and horizontal directions may be varied within wide limits. Furthermore, by a corresponding curvelike construction of the slot d the horizontal motions can be controlled so as to meet prevailing operating conditions. Instead of guiding the conveying member g by a link i it is possible to have the guiding function performed also by a correspondingly constructed slot.

In case the gear according to the invention is to be driven at high speed, it is advisable to produce the gear members from a light material. The constructional embodiment shown indicates that the gear parts may be of such simple type that they can be easily produced by punching or spraying. As the gear comprises only few parts that are moved relative to one another, they can be used even without hardened surfaces. The gear members can therefore be made from organic and/or inorganic light materials without the least trouble.

Although the invention has been described in detail with reference to the embodiment shown in the drawing, it is of course not restricted to this example but may be varied in different ways without departing from the spirit thereof.

I claim:

1. A crank operated mechanism for moving a conveying or driving member in a closed, approximately rectangular path including a rocking lever having a slot, a connecting rod having a guiding and driving pin engaged in said slot, a conveying or driving member connected at one end to said pin, and a link pivoted on said rocking lever and connected at one end to and intermediate the ends of said conveying or driving member, said slot being curved whereby a crank motion imparted to said connecting rod causes first a lateral movement of said conveying or driving member during which said pin moves freely in its slot, then a longitudinal movement when said pin abuts the end of said slot and rocks said lever, then an opposite lateral movement during which said pin moves freely in its slot, and finally an opposite longitudinal movement with said pin rocking said lever by engagement with the opposite end of its slot.

2. A mechanism in accordance with claim 1, wherein there is means to adjust the fulcrum of said rocking lever.

3. A crank operated mechanism for moving a conveyor or driving member in a closed approximately rectangular path including a rocking lever, a connecting rod, a pin and slot connection between the lever and rod, a conveying or driving member, a link pivoted on the rocking lever and connected at one end intermediate the ends of the conveying or driving member, and means on the link engageable with the lever whereby a crank motion imparted to the connecting rod initially effects a lateral movement of said conveying or driving member, then a longitudinal movement, then an opposite lateral movement and finally an opposite longitudinal movement.

FRITZ FALKENHAGEN.